United States Patent [19]

von Oertzen et al.

[11] 4,355,163
[45] Oct. 19, 1982

[54] ANTHRAQUINONE REACTIVE DYESTUFFS

[75] Inventors: Klaus von Oertzen, Cologne; Wolfgang Harms; Klaus Wunderlich, both of Leverkusen, all of Fed. Rep. of Germany

[73] Assignee: Bayer Aktiengesellschaft, Leverkusen, Fed. Rep. of Germany

[21] Appl. No.: 96,084

[22] Filed: Nov. 20, 1979

[30] Foreign Application Priority Data

Dec. 6, 1978 [DE] Fed. Rep. of Germany ....... 2852672

[51] Int. Cl.³ ................ C07D 231/38; C07C 143/665
[52] U.S. Cl. .................................... 544/189; 260/374; 544/188
[58] Field of Search ................ 260/374; 544/189, 188

[56] References Cited

U.S. PATENT DOCUMENTS

| | | | |
|---|---|---|---|
| 2,773,871 | 12/1956 | Brassel et al. | 260/374 |
| 2,889,323 | 6/1959 | Heslop | 260/374 |
| 3,073,824 | 1/1963 | Gunst et al. | 260/374 |
| 3,558,621 | 1/1971 | Bien et al. | 544/189 |

FOREIGN PATENT DOCUMENTS 2650555 5/1977 Fed. Rep. of Germany .
832400 4/1960 United Kingdom ................ 544/189

Primary Examiner—Thomas A. Waltz
Assistant Examiner—Raymond K. Covington
Attorney, Agent, or Firm—Sprung, Horn, Kramer & Woods

[57] ABSTRACT

Dyestuffs of the formula

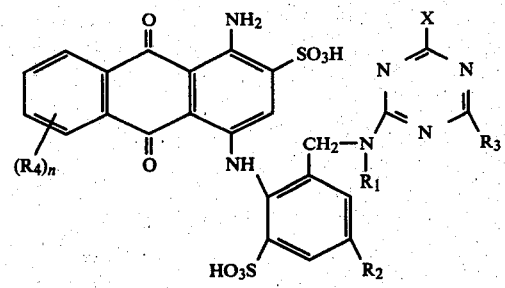

wherein
X, $R_1$, $R_2$, $R_3$ and $R_4$ have the meaning indicated in the description, and their use for dyeing and printing materials containing hydroxyl groups or amide groups, such as textile fibres, filaments and fabrics of wool, silk or synthetic polyamide or polyurethane fibres, and for dyeing and printing natural or regenerated cellulose with dyeings and prints which are fast to washing.

5 Claims, No Drawings

ANTHRAQUINONE REACTIVE DYESTUFFS

The present invention relates to dyestuffs of the formula

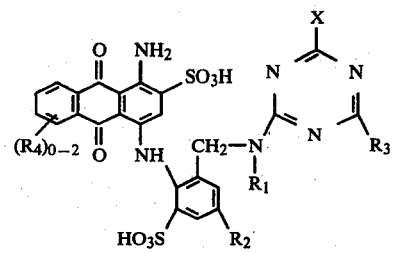

wherein
X=halogen,
$R_1$=H or optionally substituted alkyl,
$R_2$=optionally substituted alkyl,
$R_3$=a substituent, if X=Cl or Br, or, if X=F, an ether group or thioether group or the radical

in which
$R_5$ and $R_6$=independently of one another, H, optionally substituted alkyl or aralkyl, or, together with N, a heterocyclic 5-membered or 6-membered ring, or, as further $R_5$ and $R_6$

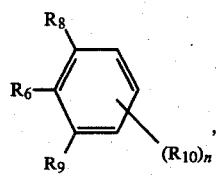

wherein
$R_8$ and $R_9$=H or $SO_3H$,
$R_{10}$=a substituent and
n=0, 1 or 2, and
$R_4$=a substituent.

Suitable radicals X are, in particular, F and Cl.

Suitable radicals $R_1$ are, in particular, H and $C_1$-$C_4$-alkyl.

Suitable radicals $R_2$ are, in particular, $C_1$-$C_4$-alkyl.

Examples of suitable radicals $R_3$ are halogen, in particular F and Cl, and the groups —$OR_7$ and —$SR_7$, in which $R_7$=low-molecular alkyl, aryl or aralkyl which can optionally be substituted, and furthermore the radicals

indicated above.

Suitable radicals $R_4$ are, in particular, sulphonic acid groups.

Substituents $R_3$ which are to be mentioned in particular are: amino, methylamino, dimethylamino, ethylamino, diethylamino, isopropylamino, butylamino, dibutylamino, sec.-butylamino, isobutylamino, diisobutylamino, tert.-butylamino, allylamino, diallylamino, methoxyethylamino, sulphatoethylamino, methoxypropylamino, ethoxypropylamino, carboxymethylamino, N-methyl-N-carboxymethylamino, carboxyethylamino, carboxypropylamino, N-methyl-N-sulphomethylamino, sulphoethylamino, N-methyl-N-sulphoethylamino, cyclohexylamino, N-methylcyclohexylamino, N-ethylcyclohexylamino, dicyclohexylamino, 2-, 3- or 4-methylcyclohexylamino, tetrahydro-3-thiopheneamino 1,1-dioxide, pyrrolidino, piperidino, 2-methylpiperidino, hexamethyleneimino, 1-methylpiperazino, morpholino, 4-morpholineamino, benzylamino, N-methylbenzylamino, dibenzylamino and arylamino.

In this context, aryl represents, in particular, phenyl or naphthyl, which can optionally be substituted, for example by sulpho, carboxyl, sulphonamide or carboxamide which is optionally monosubstituted or disubstituted by $C_1$-$C_4$-alkyl, benzyl or phenyl, phenylsulphonylaminosulphonyl or phenylsulphonylaminocarbonyl which is optionally substituted in the phenyl nucleus by $C_1$-$C_4$-alkyl, $C_1$-$C_4$-alkoxy, chlorine, nitro, carboxyl or sulpho, $C_1$-$C_4$-alkylsulphonylaminosulphonyl, $C_1$-$C_4$-alkylsulphonylaminocarbonyl, $C_1$-$C_4$-alkylsulphonyl, phenylsulphonyl which is optionally substituted by $C_1$-$C_4$-alkyl, $C_1$-$C_4$-alkoxy, chlorine, bromine, nitro, sulpho or carboxyl, $C_1$-$C_4$-alkylamino, ... optionally substituted by $C_1$-$C_4$-alkyl, $C_1$-$C_4$-alkoxy or benzylamino, nitro, cyano, halogen, such as chlorine and bromine, hydroxyl, $C_1$-$C_4$-alkylcarbonyloxy, benzoyloxy, $C_1$-$C_4$-alkoxy, $C_1$-$C_4$-alkylmercapto, $C_1$-$C_4$-alkyl or benzoylamino or benzenesulphonylamino which is optionally substituted by $C_1$-$C_4$-alkyl, $C_1$-$C_4$-alkoxy, chlorine, bromine, nitro, sulpho or carboxyl.

Radicals $R_7$ which may be mentioned are methyl, ethyl, propyl, isopropyl, butyl, isobutyl, sec.-butyl, tert.-butyl and $C_1$-$C_4$-alkoxy-$C_1$-$C_4$-alkoxy, such as methoxyethoxy, ethoxyethoxy and butoxyethoxy; and furthermore aralkyl, in particular optionally substituted benzyl or aryl. In this context, aryl represents, in particular, phenyl or naphthyl, which can be substituted.

The dyestuffs are prepared, for example, as follows:
1. By reacting compounds of the formula

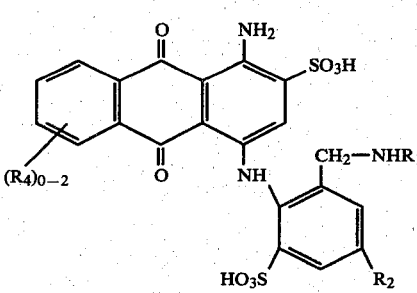

wherein
$R_1$, $R_2$ and $R_4$ have the abovementioned meaning, with compounds of the formula

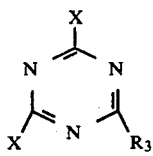

wherein
X=halogen and
R$_3$ has the abovementioned meaning.

The compounds III are obtained by reacting trihalogenotriazines with the compounds

R$_3$—H    IV

2. By reacting compounds of the formula

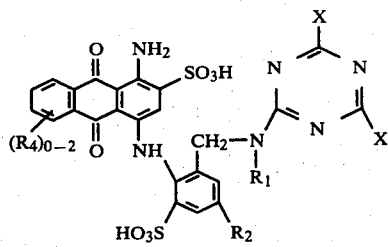

wherein
X=halogen and
R$_1$, R$_2$ and R$_4$ have the abovementioned meaning, with compounds IV.

The reactions of the compounds II with compounds III are carried out in an aqueous or organic-aqueous medium at temperatures between −10° and +80°, preferably at 0°–50°, and at pH values between 4 and 10, preferably at 5–9, in the presence of alkaline condensing agents, such as aqueous alkali metal hydroxide solutions, alkali metal carbonate solutions or alkali metal phosphate solutions.

The reactions of the compounds IV with the trihalogenotriazines to give the compounds III and the reactions of the compounds V with the compounds IV are also carried out in an analogous manner:

Examples of suitable compounds IV are methanol, ethanol, propanol, isopropanol, n-butanol, isobutanol, sec.-butanol, tert.-butanol, hexanol, cyclohexanol, β-methoxyethanol, β-ethoxyethanol, γ-methoxypropanol, γ-ethoxypropanol, β-ethoxy-β-ethoxyethanol, glycollic acid, phenol, o-, m- and p-chlorophenol, o-, m- and p-nitrophenol, o-, m- and p-hydroxybenzoic acid, o-, m- and p-phenolsulphonic acid, phenol-2,4-disulphonic acid, α-naphthol, β-naphthol, 1-hydroxynaphthalene-8-sulphonic acid, 2-hydroxynaphthalene-1-sulphonic acid, 1-hydroxynaphthalene-5-sulphonic acid, 1-hydroxynaphthalene-4-sulphonic acid, 1-hydroxynaphthalene-6- or -7-sulphonic acid, 2-hydroxynaphthalene-6-, -7- or -8-sulphonic acid, 2-hydroxynaphthalene-4-sulphonic acid, 2-hydroxynaphthalene-4,8- or -6,8-disulphonic acid, 1-hydroxynaphthalene-4,8-disulphonic acid, 2-hydroxynaphthalene-3,6-disulphonic acid, methanethiol, ethanethiol, propanethiol, isopropanethiol, n-butanethiol, thioglycol, thioglycollic acid, thiourea, thiophenol, α-thionaphthol, β-thionaphthol, ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulphonic acid, β-sulphatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methyl-aniline, 3-nitro-4-methylaniline, o-, m- and p-phenylenediamine, 3-amino-4-methylaniline, 4-amino-3-methyl-aniline, 2-amino-4-methyl-aniline, o-, m- and p-anisidine, o-, m- and p-phenetidine, naphth-1-ylamine, naphth-2-ylamine, 1,4-diaminonaphthalene, 1,5-diaminonaphthalene, 2-amino-1-hydroxy-naphthalene, 1-amino-4-hydroxy-naphthalene, 1-amino-8-hydroxy-naphthalene, 1-amino-2-hydroxynaphthalene, 1-amino-7-hydroxynaphthalene, orthanilic acid, metanilic acid, sulphanilic acid, aniline-2,4-disulphonic acid, aniline-2,5-disulphonic acid, anthranilic acid, m- and p-aminobenzoic acid, 2-aminotoluene-4-sulphonic acid, 2-aminotoluene-5-sulphonic acid, p-aminosalicylic acid, 1-amino-4-carboxybenzene-3-sulphonic acid, 1-amino-2-carboxy-benzene-5-sulphonic acid, 1-amino-5-carboxybenzene-2-sulphonic acid, 1-naphthylamine-2-, -3-, -4-, -5-, -6-, -7- and -8-sulphonic acid, 2-naphthylamine-1-, -3-, -4-, -5-, -6-, -7- and -8-sulphonic acid, 1-naphthylamine-2,4-, -2,5-, -2,7-, -2,8-, -3,5-, -3,6-, -3,7-, -3,8-, -4,6-, -4,7-, -4,8- and -5,8-disulphonic acid, 2-naphthylamine-1,5-, -1,6-, -1,7-, -3,6-, -3,7-, -4,7-, -4,8-, -5,7- and -6,8-disulphonic acid, 1-naphthylamine-2,4,6-, 2,4,7-, 2,5,7-, -3,5,7-, -3,6,8- and -4,6,8-trisulphonic acid, 2-naphthylamine-1,3,7-, -1,5,7-, -3,5,7-, -3,6,7-, -3,6,8- and -4,6,8-trisulphonic acid, 2-, 3- and 4-aminopyridine, 2-aminobenzthiazole, 5-, 6- and 8-aminoquinoline, 2-aminopyrimidine, morpholine, piperidine and piperazine.

The new dyestuffs are suitable for dyeing and printing textile materials containing hydroxyl groups or N, natural and regenerated cellulose and wool, silk and synthetic polyamides and polyurethanes.

The materials mentioned are dyed or printed by the processes customary for reactive dyestuffs.

The formulae given in the description are those of the free acids. In general, dyeing is carried out with the salts, in particular the alkali metal salts and preferably the sodium salts, potassium salts or lithium salts. In the examples, the temperatures are given in °C.

EXAMPLE 1

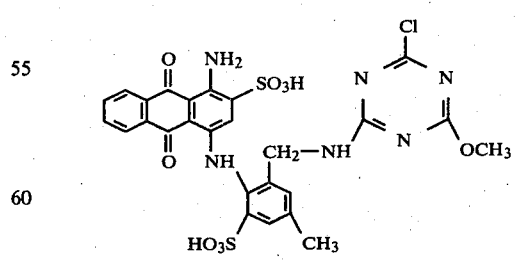

20 g of 1-amino-4-(4'-methyl-2'-aminomethylphenylamino)-anthraquinone-2,6'-disulphonic acid are stirred in 200 ml of water at 20°–125° and are dissolved at pH 6–7 by adding about 22 ml of 2 N sodium hydroxide solution. 9 g of 4,6-dichloro-2-methoxy-triazine are added and the pH value is kept between 6.5 and 7 by adding 2 N sodium hydroxide solution dropwise. When the reaction has ended, the dyestuff, which has partly pecipitated, is dissolved at 60°, the solution is clarified, after adding 4 g of active charcoal, and 5 g of sodium chloride are added to the hot filtrate. The dyestuff which has crystallised is filtered off at 35°, washed with 10% strength NaCl solution and dried at 40° in vacuo. When printed onto cotton by the processes customary for obtaining reactive prints, the dyestuff gives very clear strong reddish-tinged blue prints with very good fastness to light, wet processing and chlorine.

EXAMPLE 2

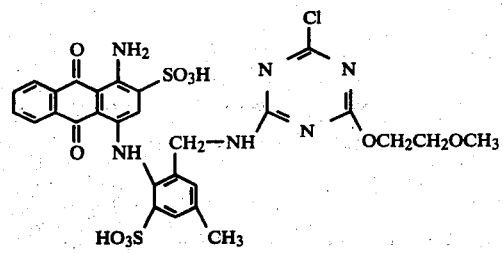

10.4 g of 4,6-dichloro-2-(2'-methoxyethoxy)-triazine are added dropwise, at 20°–25°, to the neutral solution of 1-amino-4-(4'-methyl-2'-aminomethyl-phenylamino)-anthraquinone-2,6'-disulphonic acid, prepared as in Example 1. The pH value is kept at 6.5 to 7 by adding 2 N NaOH dropwise. When the reaction has ended, the product is salted out with 15 g of sodium chloride and the dyestuff which has crystallized is filtered off and washed with 15% strength sodium chloride solution.

The dyestuff has the same dyeing properties as that described in Example 1, but a better solubility.

The dyestuffs of the general formula

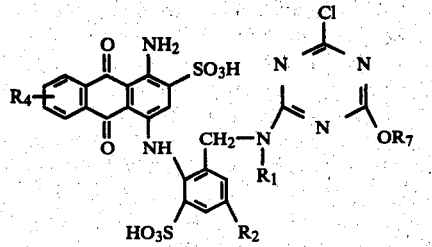

listed in the following table can be prepared analogously to Examples 1 and 2, using the appropriate starting compounds:

| Example | $R_1$ | $R_2$ | $R_7$ | $R_4$ | Colour shade on cotton |
|---|---|---|---|---|---|
| 3 | H | $CH_3$ | $CH_3$ | 6-$SO_3H$ | neutral blue |
| 4 | H | n-$C_4H_9$ | $CH_3$ | H | reddish-tinged blue |
| 5 | $CH_3$ | $CH_3$ | $CH_2CH_2OCH_3$ | H | reddish-tinged blue |
| 6 | H | $C_2H_5$ | $CH_3$ | H | reddish-tinged blue |
| 7 | H | $C(CH_3)_3$ | $CH_3$ | H | reddish-tinged blue |
| 8 | H | $CH_3$ | $CH(CH_3)_2$ | H | reddish-tinged blue |
| 9 | $CH_3$ | $CH_3$ | $CH_2CH_2OCH_3$ | 7-$SO_3H$ | neutral blue |
| 10 | H | $CH(CH_3)_2$ | $CH_2CH_2OCH_3$ | H | reddish-tinged blue |
| 11 | H | $CH_3$ | $CH_3$ | 5-$SO_3H$ | neutral blue |

EXAMPLE 12

(a) 10 g of 1-amino-4-(4'-methyl-2'-aminomethyl-phenylamino)-anthraquinone-2,6'-disulphonic acid are dissolved in 100 ml of water at 20°–25°, about 11 ml of 2 N sodium hydroxide solution being added. 50 ml of dimethylformamide are added, and a solution of 4.3 g of 2,4,6-trichlorotriazine in 25 ml of acetone is added dropwise at 0°. The pH value is kept at 5 with 2 N sodium carbonate solution until the reaction has ended. The intermediate product of the formula

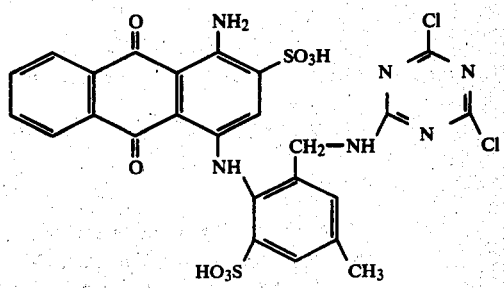

is separated out as crystals with 35 g of NaCl, filtered off and washed with 15% strength NaCl solution.

(b) The intermediate product obtained according to (a) is dissolved in a mixture of 100 ml of water and 100 ml of methanol. The pH value is adjusted to 9.5–10 with 2 N sodium hydroxide solution, the mixture is warmed to 35° and the pH value indicated is maintained, by adding the sodium hydroxide solution dropwise, until the intermediate product has been consumed. The dyestuff is separated out as crystals by adding 20 g of NaCl. It is identical to the dyestuff of Example 1.

The dyestuff can also be prepared without isolating the intermediate product, by adding 100 ml of methanol, when the reaction described under (a) has ended, and adjusting the pH value and temperature to the values indicated under (b) and proceeding further as described under (b).

EXAMPLE 13

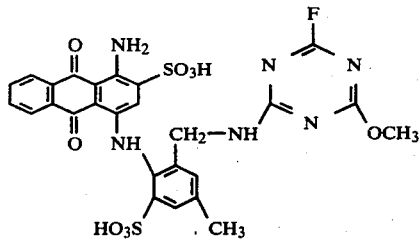

20 g of 1-amino-4-(4'-methyl-2'-aminomethyl-phenylamino)-anthraquinone-2,6'-disulphonic acid are dissolved in 200 ml of water by adding about 23 ml of 2 N sodium hydroxide solution. The solution is cooled to 5° and 8 g of 4,6-difluoro-2-methoxy-triazine are added in the course of 15 minutes. During this addition, the pH value is kept at 6.5 by adding 2 N sodium carbonate solution dropwise. When the reaction has ended, the dyestuff is salted out with 10 g of sodium chloride and the product which has crystallised is filtered off, washed with 10% strength NaCl solution and dried at 40° in vacuo.

When printed onto cotton by the processes customary for obtaining reactive prints, the dyestuff gives very clear strong reddish-tinged blue prints with very good fastness to light, wet processing and chlorine.

EXAMPLE 14

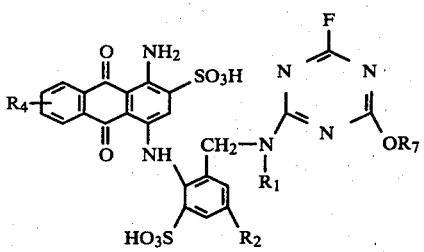

If the 8 g of 4,6-difluoro-2-methoxy-triazine in Example 13 are replaced by 10.1 g of 4,6-difluoro-2-methoxyethoxy-triazine and the procedure is otherwise as described in that example, a crystalline dyestuff which has the same dyeing properties but an even better solubility is obtained.

The dyestuffs of the general formula

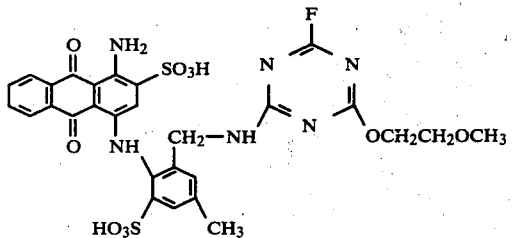

listed in the following table can be prepared analogously to Example 13 using the appropriate starting compounds:

| Example | $R_1$ | $R_2$ | $R_7$ | $R_4$ | Colour shade on cotton |
|---|---|---|---|---|---|
| 15 | H | $CH_3$ | $CH_3$ | 6-$SO_3H$ | neutral blue |
| 16 | H | n-$C_4H_9$ | $CH_3$ | H | reddish-tinged blue |
| 17 | $CH_3$ | $CH_3$ | $CH_2CH_2OCH_3$ | H | reddish-tinged blue |
| 18 | H | $C_2H_5$ | $CH_3$ | H | reddish-tinged blue |
| 19 | H | $C(CH_3)_3$ | $CH_3$ | H | reddish-tinged blue |
| 20 | H | $CH_3$ | $CH(CH_3)_2$ | H | reddish-tinged blue |
| 21 | $CH_3$ | $CH_3$ | $CH_2CH_2OCH_3$ | 7-$SO_3H$ | neutral blue |
| 22 | H | $CH(CH_3)_2$ | $CH_2CH_2OCH_3$ | H | reddish-tinged blue |
| 23 | H | $CH_3$ | $CH_3$ | 5-$SO_3H$ | neutral blue |

EXAMPLE 24

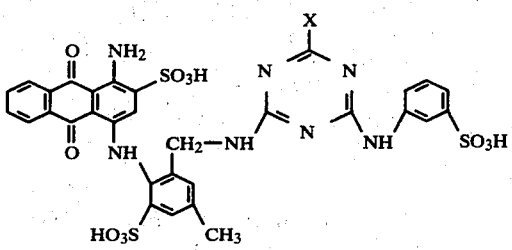

25 g of 1-amino-4-(4'-methyl-2'-aminomethyl-phenylamino)-anthraquinone-2,6'-disulphonic acid are dissolved, at pH 7, in 250 ml of water. A solution of the reaction product of 9.2 g of metanilic acid and 9.8 g of cyanuric chloride in 250 ml of water is added dropwise at 20°–25° in the course of 30 minutes, the pH value being kept at 7–7.5 with 2 N sodium carbonate solution. When the reaction has ended, the dyestuff is salted out by adding 55 g of sodium chloride, filtered off, washed with 15% strength sodium chloride solution and dried at 40° in vacuo. On cotton, the dyestuff gives clear reddish-tinged blue prints with a high level of fastness.

EXAMPLE 25

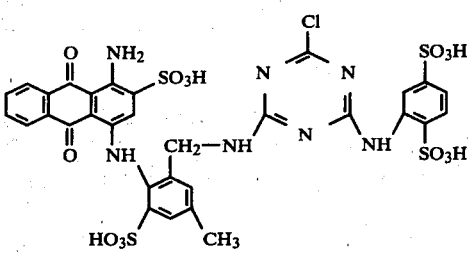

If the metanilic acid in Example 24 is replaced by an equivalent amount of aniline-2,5-disulphonic acid, the reaction is carried out in an analogous manner and the product is salted out with 150 g of sodium chloride, a dyestuff with similar properties and an even better solubility is obtained.

EXAMPLE 26

10 g of the intermediate product according to Example 12a are dissolved in 150 ml of water. A solution of 2.7 g of metanilic acid, 22 ml of water and 8 ml of 2 N NaOH is added dropwise at 25°–30° and the pH value is kept at 7–7.5 with 2 N sodium hydroxide solution. When the reaction has ended, the dyestuff is salted out with 20 g of sodium chloride. It is identical to the product described in Example 24.

The dyestuffs of the general formula

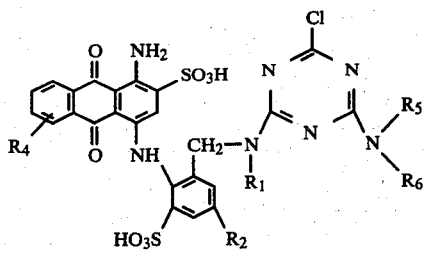

listed in the following table can be prepared analogously to Examples 24 to 26 using the appropriate starting compounds:

EXAMPLE 39

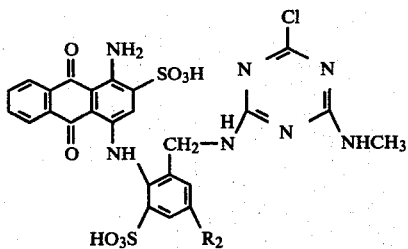

5.9 g of 2-methylamino-4,6-dichloro-triazine are added to 10 g of 1-amino-4-(4'-methyl-2'-aminomethyl-phenylamino)-anthraquinone-2,6'-disulphonic acid, dissolved in 150 ml of water with 12 ml of 2 N NaOh. The mixture is heated to 40° and the pH value is kept at 7.5 with 2 N sodium hydroxide solution. When the reaction has ended, insoluble residues are filtered off, 10 g of NaCl are added to the filtrate and the dyestuff which has separated out is filtered off, washed with 10% strength sodium chloride solution and dried at 45° in vacuo.

When printed onto cotton by the processes customary for obtaining reactive prints, the dyestuff gives clear reddish-tinged blue prints with a high level of fastness.

EXAMPLE 40

10 g of the intermediate product according to Example 12a are dissolved in 150 ml of water. 1.75 g of 30% strength aqueous methylamine solution are added dropwise and the pH value is kept at 8 with 2 N sodium hydroxide solution. When no further starting material

| Example | $R_1$ | $R_2$ | $R_5$ | $R_6$ | $R_4$ | Colour shade on cotton |
|---|---|---|---|---|---|---|
| 27 | H | $CH_3$ | H | ⌬-$SO_3H$ (meta) | 6-$SO_3H$ | neutral blue |
| 28 | $CH_3$ | $CH_3$ | $CH_3$ | —$CH_2SO_3H$ | H | reddish-tinged blue |
| 29 | H | $CH_3$ | H | —$CH_2CH_2SO_3H$ | H | reddish-tinged blue |
| 30 | H | $C(CH_3)_3$ | H | —$CH_2CH_2OSO_3H$ | H | reddish-tinged blue |
| 31 | $CH_3$ | $CH_3$ | H | —$CH_2CH_2SO_3H$ | H | reddish-tinged blue |
| 32 | H | $CH_3$ | H | $HO_3S$-⌬-$SO_3H$ | 5-$SO_3H$ | neutral blue |
| 33 | H | $CH_3$ | H | ⌬-COOH | H | reddish-tinged blue |
| 34 | H | $n-C_4H_9$ | H | ⌬-$SO_3H$ | H | reddish-tinged blue |
| 35 | H | $CH_3$ | H | ⌬-$SO_3H$ (meta) | 7-$SO_3H$ | neutral blue |
| 36 | H | $C_2H_5$ | H | —$CH_2CH_2OSO_3H$ | H | reddish-tinged blue |
| 37 | H | $CH_3$ | H | ⌬-$SO_2NHCH_2CH_2OSO_3H$ | H | reddish-tinged blue |
| 38 | H | $CH_3$ | H | ⌬-$SO_2CH_2CH_2OSO_3H$ | H | reddish-tinged blue | can be detected, the product is salted out with 10 g of sodium chloride. The dyestuff thus obtained is identical to that of Example 39.

The dyestuffs of the general formula

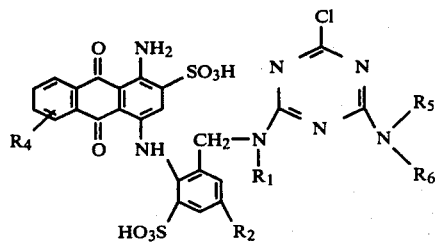

listed in the following table can be prepared analogously to Examples 39 and 40 using the appropriate starting compounds.

| Example | $R_1$ | $R_2$ | $R_5$ | $R_6$ | $R_4$ | Colour shade on cotton |
|---|---|---|---|---|---|---|
| 41 | H | $CH_3$ | $CH_3$ | $CH_3$ | H | reddish-tinged blue |
| 42 | $CH_3$ | $CH_3$ | H | $CH_3$ | H | reddish-tinged blue |
| 43 | H | $CH_3$ | H | –⟨phenyl⟩ | H | reddish tinged blue |
| 44 | H | $CH_3$ | $C_2H_5$ | $C_2H_5$ | H | reddish-tinged blue |
| 45 | H | $C(CH_3)_3$ | H | $CH_3$ | H | reddish-tinged blue |
| 46 | H | $CH_3$ | H | $CH_3$ | 7-$SO_3H$ | neutral blue |
| 47 | H | $CH_3$ | H | $nC_4H_9$ | H | reddish-tinged blue |

EXAMPLE 48

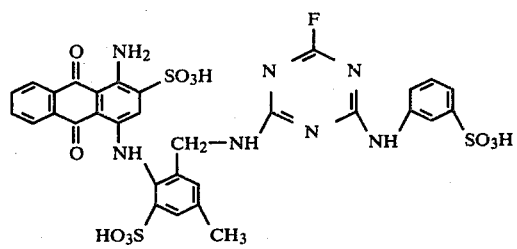

A solution of the reaction product of 10.7 g of metanilic acid and 8.3 g of trifluorotriazine in 120 ml of water is allowed to run into a solution, prepared as in Example 1, of 20 g of 1-amino-4-(4'-methyl-2'-aminomethyl-phenylamino)-anthraquinone-2,6'-disulphonic acid in 200 ml of water at 20°. During this addition, the pH value is kept at 6.5–7 with 2 N sodium hydroxide solution. When no further starting material can be detected by chromatography, the product is salted out with 45 g of sodium chloride and the black-blue crystals are filtered off and washed with 15% strength sodium chloride solution. On cotton, the dyestuff, dried at 45°, gives very clear reddish-tinged blue prints with very good fastness properties.

The dyestuffs of the general formula

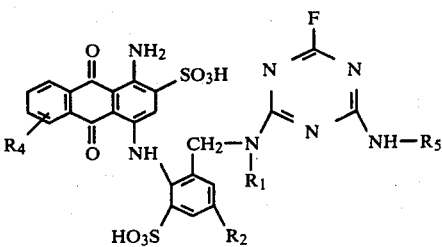

listed in the following table can be prepared analogously to Example 48 using the appropriate starting compounds:

| Example | $R_1$ | $R_2$ | $R_5$ | $R_4$ | Colour shade on cotton |
|---|---|---|---|---|---|
| 49 | H | $CH_3$ | –⟨C_6H_4⟩–$SO_3H$ | H | reddish-tinged blue |
| 50 | H | $CH_3$ | –⟨C_6H_4⟩–$CH_3$ | H | reddish-tinged blue |
| 51 | $CH_3$ | $CH_3$ | –⟨C_6H_4⟩–$SO_3H$ (meta) | H | reddish-tinged blue |
| 52 | H | $C(CH_3)_3$ | –⟨C_6H_3(CH_3)(HO_3S)⟩–$SO_3H$ | H | reddish-tinged blue |
| 53 | H | $CH_3$ | –⟨C_6H_4⟩–$SO_3H$ (meta) | 6-$SO_3H$ | neutral blue |
| 54 | H | $CH_3$ | –⟨C_6H_4⟩–$SO_2CH_2CH_2OSO_3H$ | H | reddish-tinged blue |

EXAMPLE 55

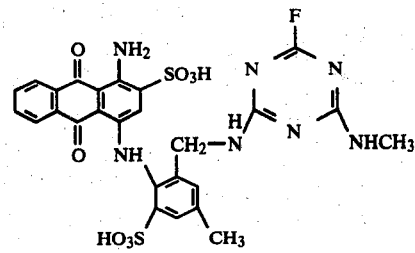

7.3 g of methylamino-difluorotriazine are added to a solution, prepared as in Example 1, of 20 g of 1-amino-4-(4'-methyl-2'-aminomethyl-phenylamino)-anthraquinone-2,6'-disulphonic acid in 200 ml of water at 20°. The pH value is kept at 6.5-7 with 2 N sodium hydroxide solution until the reaction has ended. The dyestuff is separated out in the form of crystals by adding 20 g of sodium chloride, filtered off, washed with 15% strength sodium chloride solution and dried at 45°. On cotton, the dyestuff gives clear reddish-tinged blue prints with very good fastness properties.

The dyestuffs of the general formula

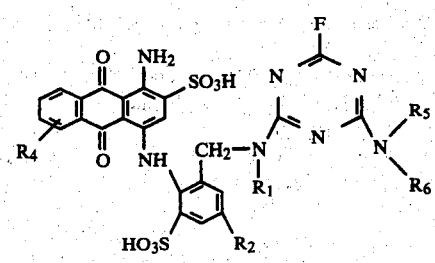

listed in the following table can be prepared in a similar manner using the appropriate compounds:

| Example | $R_1$ | $R_2$ | $R_5$ | $R_6$ | $R_4$ | Colour shade on cotton |
|---|---|---|---|---|---|---|
| 56 | H | $CH_3$ | $C_2H_5$ | $C_2H_5$ | H | reddish-tinged blue |
| 57 | H | $CH_3$ | H | $CH_3$ | 7-$SO_3H$ | neutral blue |
| 58 | $CH_3$ | $CH_3$ | $CH_3$ | $CH_3$ | H | reddish-tinged blue |
| 59 | H | $C(CH_3)_3$ | H | $CH_3$ | H | reddish-tinged blue |

We claim:
1. Reactive dyestuffs of the formula

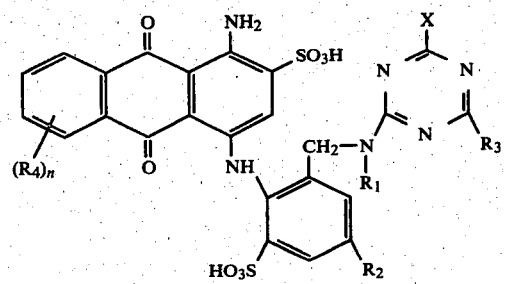

wherein
X=halogen
$R_1$=H or alkyl $R_2$=alkyl
$R_3$=stands for halogen, $OR_7$, $SR_7$ or

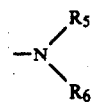

wherein
$R_7$=low-molecular alkyl, low-molecular alkyl substituted by $C_1$-$C_4$-alkoxy, aryl or aralkyl and wherein
$R_5$ and $R_6$=independently of one another, H, alkyl, alkyl substituted by $SO_3H$, $OSO_3H$; or aralkyl, or together with N, a heterocyclic 5-membered or 6-membered ring, or as further $R_5$ and $R_6$

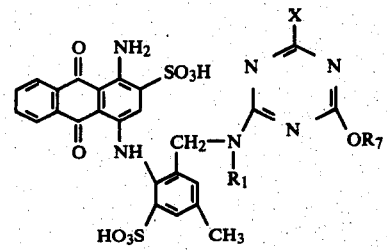

wherein
$R_8$ and $R_9$=H or $SO_3H$
$R_{10}$=$SO_3H$, halogen, COOH, $CH_3$, $SO_2CH_2CH_2OSO_3H$ or $SO_2NH$-$CH_2$-$CH_2$-$OSO_3H$,
n=0 to 2
$R_4$=$SO_3H$.

2. Reactive dyestuffs of the formula

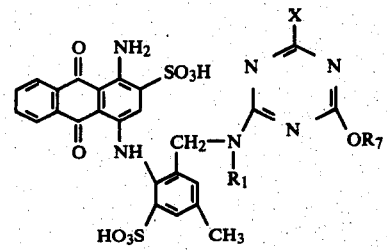

wherein
X=fluorine or chlorine,
$R_1$=H or alkyl and
$R_7$=alkyl or $C_1$-$C_4$-alkoxy.

3. Reactive dyestuff of the formula

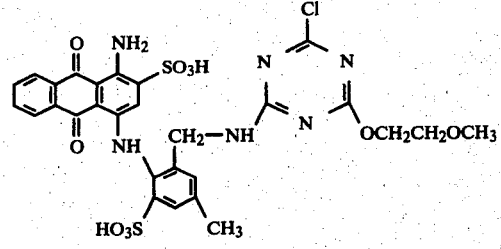

4. Reactive dyestuff of the formula

5. Reactive dyestuffs of the formula

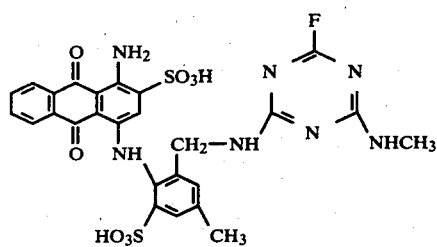

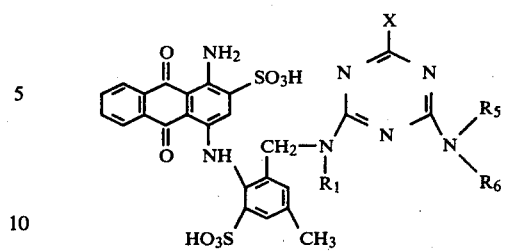

wherein
X = fluorine or chlorine,
$R_1$ = H or alkyl,
$R_5$ and $R_6$ = independently of one another, hydrogen, alkyl, aralkyl or wherein
$R_8$ and $R_9$ = independently of one another, hydrogen or a sulphonic acid group,
$R_{10}$ = $SO_3H$, halogen, COOH, $CH_3$, $SO_2CH_2OSO_3H$ or $SO_2NH$-$CH_2$-$CH_2$-$OSO_3H$ and,
n = 0, 1 or 2, and furthermore
$R_5 + R_6$ = together with N, a heterocyclic 5-membered or 6-membered ring.

* * * * *

UNITED STATES PATENT AND TRADEMARK OFFICE
CERTIFICATE OF CORRECTION

PATENT NO. : 4,355,163
DATED : October 19, 1982

Page 1 of 2

INVENTOR(S) : Klaus Von Oertzen et al

It is certified that error appears in the above—identified patent and that said Letters Patent is hereby corrected as shown below:

Col. 4, line 66      Delete "-125°" and insert -- -25° --
Col. 8, line 30-33    Delete " 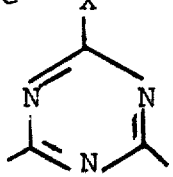 "
(Middle of structure)

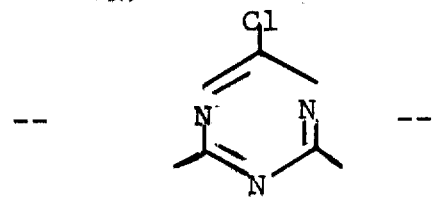
and insert -- --

Col. 10, lines 10-13    Delete " 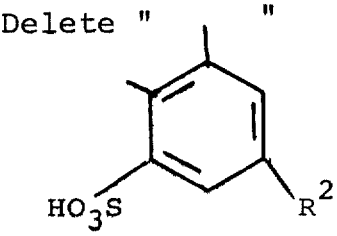 "
(Bottom of Structure)

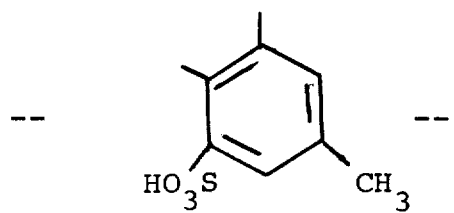
and insert -- --

UNITED STATES PATENT AND TRADEMARK OFFICE
CERTIFICATE OF CORRECTION

PATENT NO. : 4,355,163
DATED : October 19, 1982
INVENTOR(S) : Klaus Von Oertzen et al It is certified that error appears in the above—identified patent and that said Letters Patent is hereby corrected as shown below:

Col. 10, line 18    Delete "NaOh" and insert --NaOH--

Col. 14, line 54    After "alkoxy" add omitted words --substituted alkyl--

Signed and Sealed this

Eighteenth Day of January 1983

[SEAL]

Attest:

Attesting Officer

GERALD J. MOSSINGHOFF
Commissioner of Patents and Trademarks